United States Patent
Jiang et al.

(10) Patent No.: US 8,520,814 B2
(45) Date of Patent: Aug. 27, 2013

(54) COMMUNICATIONS DEVICE AND METHOD FOR SELECTING A MISSED CALL REMINDER ALERT

(75) Inventors: Tao Jiang, Jiangsu (CN); Xiao-Lei Shi, Jiangsu (CN); Hai Wang, Jiangsi (CN)

(73) Assignee: Motorola Mobility LLC, Libertyville, IL (US)

( * ) Notice: Subject to any disclaimer, the term of this patent is extended or adjusted under 35 U.S.C. 154(b) by 1103 days.

(21) Appl. No.: 12/247,575

(22) Filed: Oct. 8, 2008

(65) Prior Publication Data

US 2010/0086112 A1   Apr. 8, 2010

(51) Int. Cl.
*H04M 11/00* (2006.01)
(52) U.S. Cl.
USPC ............ 379/93.23; 455/412.2; 455/415
(58) Field of Classification Search
USPC .............. 379/93.23; 455/412.2, 415, 466, 455/567
See application file for complete search history.

(56) References Cited

U.S. PATENT DOCUMENTS

| | | | |
|---|---|---|---|
| 6,161,021 A | 12/2000 | Akpa | |
| 6,728,349 B2* | 4/2004 | Chang et al. | 379/93.23 |
| 2001/0029194 A1* | 10/2001 | Ketola et al. | 455/567 |
| 2002/0127998 A1* | 9/2002 | Katayanagi | 455/412 |
| 2002/0142792 A1* | 10/2002 | Martinez | 455/550 |
| 2003/0198324 A1 | 10/2003 | Chang et al. | |
| 2005/0201362 A1 | 9/2005 | Klein et al. | |
| 2006/0240877 A1* | 10/2006 | Filiba et al. | 455/567 |
| 2007/0001820 A1* | 1/2007 | Luo | 340/309.7 |

* cited by examiner

*Primary Examiner* — Stella Woo

(57) ABSTRACT

A communications device and method for selecting a missed call reminder alert by comparing an identifier associated with a telephone number of an unattended received communications call with a database of alert profiles stored a memory of the communications device. The comparing identifies a call reminder alert time profile for the unattended received communications call. Next, there is performed a selecting, from the database of alert profiles, an identified call reminder alert time profile for the unattended received communications call. Thereafter, the communications device and method provide for emitting the missed call reminder alert based on the identified call reminder alert time profile.

20 Claims, 3 Drawing Sheets

| NAME | NUMBER | GROUP | PROFILE | |
|---|---|---|---|---|
| WIFE | 000110101 | FAMILY | IMPORTANT; ANYTIME | —251 |
| BILL | 099110101 | FRIEND | NOT URGENT; AFTER WORK | —252 |
| BOSS | 099116601 | WORK | V IMPORTANT; ANYTIME | —253 |
| JESS | 099117601 | WORK | V IMPORTANT; ANYTIME | —254 |
| UNKNOWN | | STRANGER | LOW; AFTER WORK | —255 |
| JIM | 123456611 | AVOID | V LOW; NEVER | —256 |
| ⋮ | ⋮ | ⋮ | ⋮ | |

COMMUNICATIONS DEVICE AND METHOD FOR SELECTING A MISSED CALL REMINDER ALERT

FIELD OF THE INVENTION

The present invention relates generally to a communications device and method for selecting a missed call reminder alert. The invention is specifically useful for, but not necessarily limited to, selecting different call reminder alert time profiles for individual callers or groups of callers that have sent a text message to a communications device such as a mobile telephone.

BACKGROUND OF THE INVENTION

Electronic devices such as mobile telephones, hand held personal computers and personal digital assistants (PDA's) with mobile telephone capabilities have multiple functionalities. Such functionalities include the ability to make and receive telephone calls and send and receive text messages. Such text messages are typically provided by Short Message Service (SMS) applications, Multimedia Message Service (MMS) applications and Enhanced Message Service (EMS) applications.

Using mobile telephones for voice communication and text messaging by an SMS application or otherwise has become very popular. When a user misses an incoming call or text message, or is unable to either immediately attend to an incoming call or read an incoming text message, the user is often reminded by what is know as a missed call reminder alert to at least check (on a display screen of the mobile telephone) for details of either a missed call (unanswered call) or an unread text message. Such a missed call reminder alert is typically an audible signal, such as a beep, emitted by a speaker of the mobile telephones at regular time intervals. The missed call reminder alert will keep repeating at the regular time intervals until the user checks the details of either the missed call (unanswered call) or the unread text message. This repeating of the missed call alert at the regular time intervals for all unanswered calls or unread text messages can be inconvenient, especially when the user is busy or resting (for example when asleep). Furthermore, the missed call alert does not distinguish between calls from different caller identifiers and the continuous repeating of the missed call alert at regular time intervals may cause unnecessary battery power drain.

BRIEF DESCRIPTION OF THE DRAWINGS

In order that the invention may be readily understood and put into practical effect, reference now will be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where:

FIG. 2 is a diagram illustrating a database of alert profiles stored in a memory of the communications device of FIG. 1.

Figure 1:
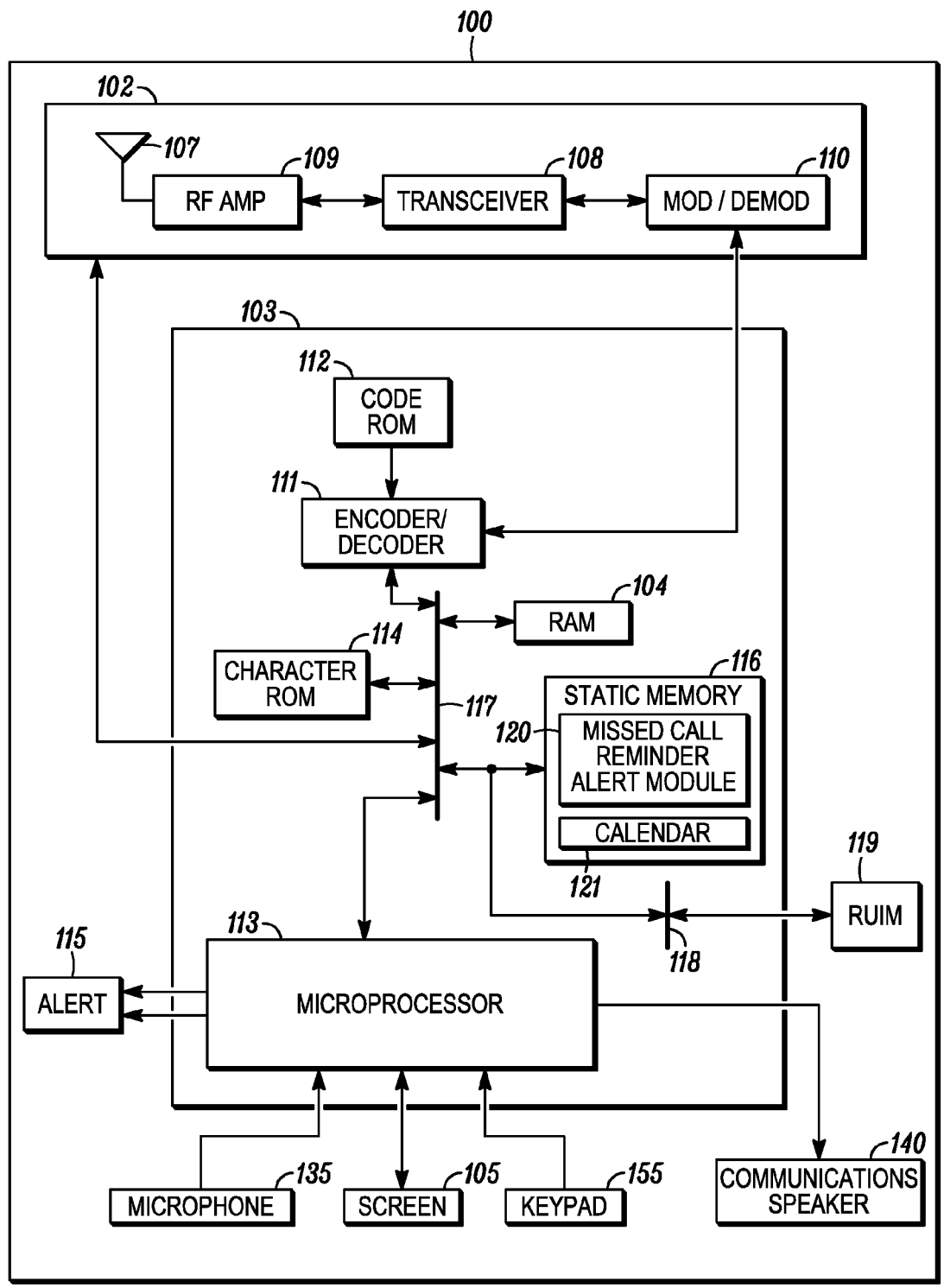
FIG. 1 is a schematic diagram illustrating schematic diagram of a communications device typically in the form of a mobile telephone that performs a method for replying to a received text message in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in device components and method steps. Accordingly, the components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that devices and method steps that comprises a list of elements does not include only those elements but may include other elements or steps not expressly listed or inherent to such devices and method steps. An element proceeded by "comprises . . . a" does not, without more constraints, preclude the existence of additional identical elements in the device that comprises the element.

According to one aspect of the disclosure there is provided a method for selecting a missed call reminder alert, the method being performed by a communications device, the method an identifier associated with a telephone comprising: comparing number of an unattended received communications call with a database of alert profiles stored a memory of the communications device, the comparing identifying a call reminder alert time profile for the unattended received communications call; selecting, from the database of alert profiles, an identified call reminder alert time profile for the unattended received communications call; and emitting the missed call reminder alert based on the identified call reminder alert time profile.

According to another aspect of the disclosure there is provided a communications device comprising: a processor; a memory associated with the processor; an alert module coupled to the processor; and a communications unit coupled to the processor. In operation, after the communications unit has received an unattended communications call, the processor stores details of the unattended communications call in the memory and thereafter the processor performs comparing a telephone number of an unattended received communications call with a database of alert profiles stored a memory of the communications device. The comparing identifies a call reminder alert time profile for the unattended received communications call, and wherein the processor further performs selecting an identified call reminder alert time profile for the unattended received communications call and controlling the alert module to emit the missed call reminder alert based on the identified call reminder alert time profile.

Referring to FIG. 1, there is illustrated a schematic diagram of a communications device 100, such as a portable wireless communications device typically in the form of a mobile telephone comprising a radio frequency communications unit 102 coupled to be in communication with a processor 103. The communications device 100 also includes a display screen 105 that is typically a Liquid Crystal Display (LCD). There is also an alert module 115 that typically contains an alert speaker, vibrator motor and associated drivers. The display screen 105, and alert module 115 are coupled to be in communication with the processor 103. Although only the display screen 105 is illustrated, it will be apparent to a person skilled in the art that the e communications device 100 may, in some embodiments, have an auxiliary display screen. For instance, an auxiliary display screen can form part of the communications device 100 if the communications device 100 has a two part closable housing, wherein the auxiliary display screen is visible when the closable housing is in a closed position and the display screen 105 is typically only viewable when the closable housing is in an opened position.

The processor 103 includes an encoder/decoder 111 with an associated code Read Only Memory (ROM) 112 for storing data for encoding and decoding voice or other signals that may be transmitted or received by the communications device 100. The processor 103 also includes a micro-processor 113 coupled, by a common data and address bus 117, to the encoder/decoder 111, the radio frequency communications unit 102, a character Read Only Memory (ROM) 114, a Random Access Memory (RAM) 104, a static programmable memory 116 and a Removable User Identity Module (RUIM) interface 118. The character Read Only Memory 114 stores code for decoding or encoding text messages that may be received by the radio frequency communications unit 102.

A RUIM card 119 (commonly referred to as a Subscriber Identity Module (SIM) card) is operatively coupled to the RUIM interface 118. The static programmable memory 116 and RUIM card 119 each can store, amongst other things, Preferred Roaming Lists (PRLs), subscriber authentication data, selected incoming text messages and a Telephone Number Database (TND phonebook) comprising a number field for telephone numbers and a name field for identifiers associated with one of the numbers in the name field. The RUIM card 119 and static programmable memory 116 may also store passwords for allowing accessibility to password-protected functions.

The micro-processor 113 has ports for coupling to the display screen 105, and the alert module 115. Also, micro-processor 113 has ports for coupling to a microphone 135, a communications speaker 140, and keypad 155. In this embodiment the character Read Only Memory 114 and static programmable memory 116 also store Operating Code (OC) for the micro-processor 113 and code for performing functions associated with the communications device 100. Furthermore, the static programmable memory 116 includes: a) a calendar 121 for, amongst others, blocking of times of the day when a user (owner/user of the communications device 100) is busy; and b) a missed call reminder alert module 120 that provides code to the microprocessor 113 for performing a method for selecting a missed call reminder alert as described later in this specification.

Typically the radio frequency communications unit 102 is a combined receiver and transmitter having an antenna 107. The radio frequency communications unit 102 has a transceiver 108 coupled to the antenna 107 via a radio frequency amplifier 109. The transceiver 108 is also coupled to a combined modulator/demodulator 110 that couples the radio frequency communications unit 102 to the processor 103.

Referring to FIG. 2 there is illustrated a database of alert profiles 200 that comprises a name field 210, a telephone number field 220, group field 230 and a call reminder alert time profile field 240. In this exemplary embodiment the call reminder alert time profile field 240 has two subfields, these being a Time Interval Frequency Profiles (TIFP) and an Allowable Alert Time Profile (AATP). The Allowable Alert Time Profile (AATP) can comprise an Allowable Time of Day Profile (ATDP) and an Allowable Days Of The Week Profile (ADOTW). The database of alert profiles 200 is typically stored in the missed call reminder alert module 120 and can be modified by a user via the keypad 155. As illustrated a first row 251 of the database of alert profiles 200 has the identifier "Wife" in the name field 210 that is associated with and identifies the telephone number in the telephone number field 220 as belonging to the user's wife that has been classified in the group "Family" in the group field 230. The profile for "Family", in the profile field 240, has been set by the user as IMPORTANT; ANYTIME.

A second row 252 of the database of alert profiles 200 has the identifier "Bill" in the name field 210 that is associated with and identifies the telephone number in the telephone number field 220 for "Bill" that has been classified into the group "Friend" in the group field 230. The profile for "Friend", in the profile field 240, has been set by the user as NOT URGENT; AFTER WORK. A third row 253 of the database of alert profiles 200 has the identifier "Boss" in the name field 210 that is associated with and identifies the telephone number in the telephone number field 220 for "Boss" that has been classified into the group "Work" in the group filed 230. The profile for "Work", in the profile field 240, has been set by the user as V IMPORTANT; ANYTIME. A fourth row 254 of the database of alert profiles 200 has the identifier "Jess" in the name field 210 that is associated with and identifies the telephone number in the telephone number field 220 for "Jess" that has been classified into the group "Work" in the group filed 230. Again, the profile for "Work", in the profile field 240, has been set by the user as V IMPORTANT; ANYTIME. A fifth row 255 of the database of alert profiles 200 has the identifier "Unknown" in the name field 210 that corresponds to any unknown telephone number that has not been stored in the telephone number field 220. Such unknown numbers are classified into the group "Stranger" in the group field. The profile for "Stranger", in the profile field 240, has been set by the user as LOW; AFTER WORK. A sixth row 256 of the database of alert profiles 200 has the identifier "Jim" in the name field 210 that is associated with and identifies the telephone number in the telephone number field 220 for "Jim" that has been classified into the group "Avoid" in the group field 230. The profile for "Avoid", in the profile field 240, has been set by the user as V LOW; NEVER.

As will be apparent to a person skilled in the art, many more entries can be included into the database of alert profiles 200 and a user can create new group types and define a specific group profile for a group type in the profile field 240. Also, the actual call reminder alert profile can be programmed by the user. For instance, the call reminder alert profile for the group family is set to IMPORTANT; ANYTIME in the profile field 240. The profile name IMPORTANT indicates a Time Interval Frequency Profile (TIFP) that the user can set or that may be preset by the manufacturer of the communications device 100. Thus, the user could set the predefined time duration Time Interval Frequency Profile (TIFP) to be 10 minutes for the call reminder alert profile associated with IMPORTANT and for Time Interval Frequency Profile (TIFP) associated with V IMPORTANT, the user can set a shorter duration of for example 5 minutes. Less important Time Interval Frequency Profiles (TIFP) can be set to longer durations as required. In addition, the profile name ANYTIME indicates an Allowable Time of Day Profile (ATDP) that the user (or manufacturer) has set for the call reminder alert to be emitted by the communications device. For the groups Family and Work the Allowable Time of Day Profile (ATDP) is set to ANYTIME which is typically set to be 24 hours a day 7 days a week. In contrast, the Allowable Time of Day Profile (ATDP) for AFTER WORK could be set to mean 7 pm to 10 pm weekdays, 10 am to 10 pm weekends. Also, the Allowable Time of Day Profile (ATDP) for NEVER could be set so a missed call reminder alert having the call reminder alert profile NEVER will result in any missed call in the group AVIOD will never result in a missed call reminder alert being provided by the communications device 100. The same also applies to the Time Interval Frequency Profile (TIFP) V Low.

Figure 3:
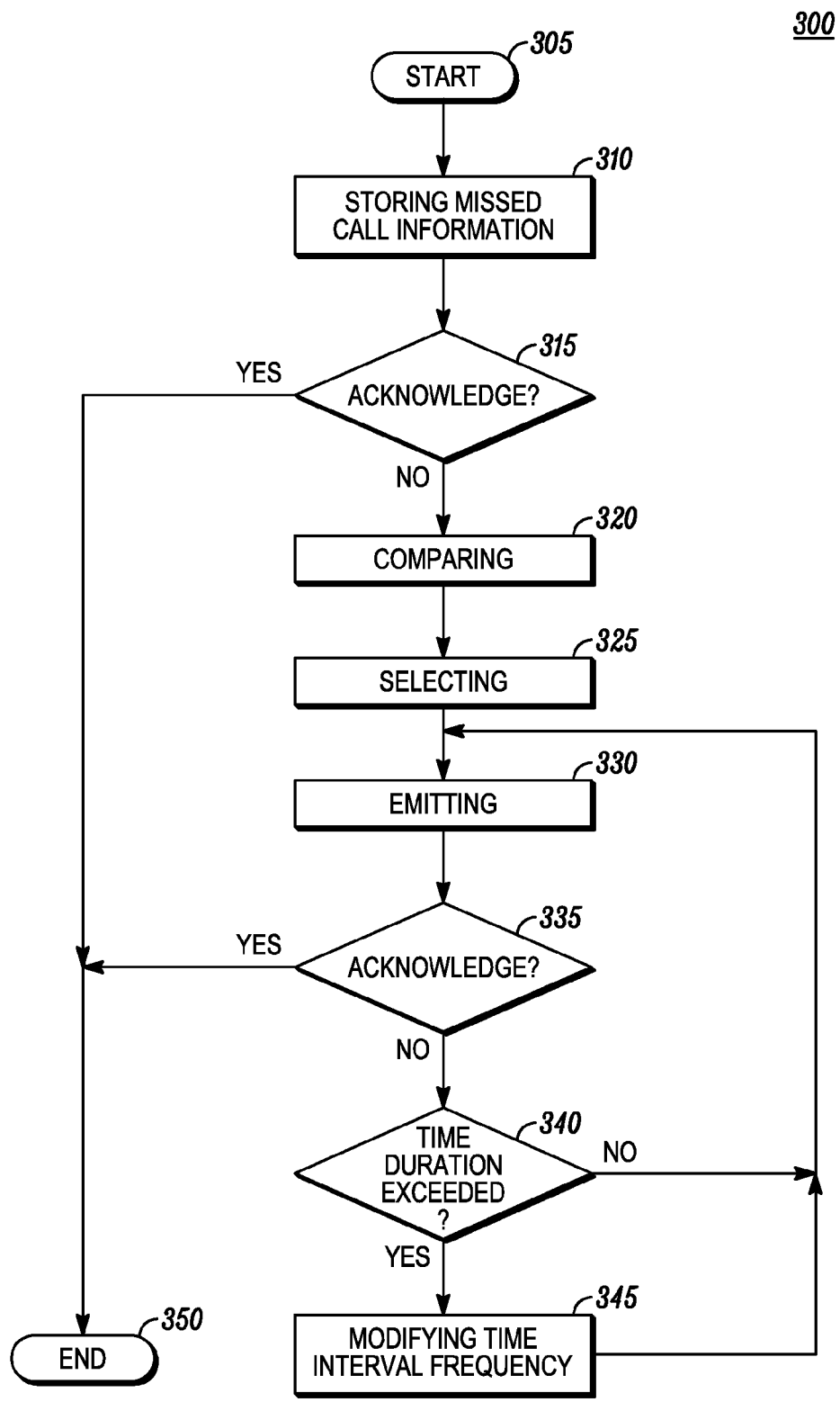
FIG. 3 is a flow diagram illustrating a method 300 for selecting a missed call reminder alert message in accordance with embodiments of the present invention.

Referring to FIG. 3 there is illustrated a method 300 for selecting a missed call reminder alert. The method 300 is invoked at a start block 305 after an incoming unattended communications call is received by the radio frequency communications unit 102. During a storing missed call information block 310 the processor 103 stores details of the unattended communications call in the static programmable memory 116. The unattended communications call can be a missed or un-answered voice communications call or it can be an unread (un-previewed) received test message such as a message from Short Message Service (SMS) applications, Multimedia Message Service (MMS) applications or Enhanced Message Service (EMS). At a test block 315 the method 300 determines if a user has acknowledged the unattended communications call. In this context acknowledged has the meaning that the user has input a command, for instance by actuating a key on the keypad 155, in order to read on the display screen 105 who has sent the unattended communications call, a missed or un-answered voice communications call or an unread (un-previewed) test message.

If the method 300, at test block 315, determines that the user has acknowledged the unattended communications call then the method 300 terminates at an end block 350. However, if the method 300, at test block 315 determines that the user has not acknowledged the unattended communications call then a comparing block 320 performs comparing an identifier associated with the telephone number of an unattended received communications call with the database of alert profiles 200 stored a static programmable memory 116. The identifier associated with the telephone number of the unattended received communications call can simply be the telephone number itself, a caller identifier (caller ID) or the name in the name field 210. Thus, the comparing of block 320 performs identifying the call reminder alert time profile 240 based on the identifier associated with the telephone number for the unattended received communications call.

Next at a selecting block 325 the method 300 performs selecting, from the database of alert profiles 200, the call reminder alert time profile, for the unattended received communications call, that includes the Time Interval Frequency Profile (TIFP) and the Allowable Time of Day Profile (ATDP). Thereafter, at an emitting block 330, there is performed emitting the missed call reminder alert, by the alert module 115, based on the identified call reminder alert time profile 240. A further acknowledge test is performed at a test block 335 to determine if after or during the performance of the emitting the missed call reminder alert the user has acknowledged the unattended communications call. Again, in this context acknowledged has the meaning that the user has input a command, for instance by actuating a key on the keypad 155, in order to read on the display screen 105 who has sent the unattended communications call, a missed or un-answered voice communications call or an unread (un-previewed) test message.

If the method 300, at test block 335, determines that the user has acknowledged the unattended communications call then the method 300 terminates at an end block 350. Alternatively, if the method 300, at test block 340 determines that the user has not acknowledged the unattended communications call then a time duration exceeded test is performed at a test block 340. The time duration exceeded test block 340 determines if a predefined time duration has been exceeded since the unattended communications call was received by the radio frequency communications unit 102. For instance, if the predefined time duration is set to one hour, then until one hour has passed since the unattended communications call was received blocks 330 and 335 will be repeated so that the emitting block 330 will emit the missed call reminder alert based on the identified call reminder alert time profile. However, once the predefined time duration (in this example one hour) has been exceeded then a modifying block 345 performs modifying the time interval frequency in which the time identified by the Time Interval Frequency Profile (TIFP) is temporarily modified until the method 300 terminates.

The time interval frequency indicated by the Time Interval Frequency Profile (TIFP) may temporarily modified (for example by a multiplier operation) so that the time interval frequency is modified to be of a greater time duration between repeating the emitting the missed call reminder alert at the emitting block 330. This therefore saves on battery consumption. Alternatively, the time interval frequency indicated by the time Interval Frequency Profile (TIFP) may be temporarily modified so that the time interval frequency is modified to be of a shorter time duration between repeating the emitting the missed call reminder alert at the emitting block This therefore has a higher probability of alerting the user of the missed call. Hence, from the above it will be apparent that emitting the missed call reminder alert is repeated, by emitting block 340, at the time interval frequency determined by the determined by the Time Interval Frequency Profile (TIFP) identified in the call reminder alert time profile for a predefined number of repetitions. Thereafter the time interval frequency is modified and once the missed call is acknowledged as detected at test block 335 the method 300 terminates at end block 350.

Referring back to the emitting block 330 that performs emitting the missed call reminder alert, this emitting is controlled by the identified call reminder alert time profile. Thus, the emitting the missed call reminder alert is repeated at a time interval frequency determined by the identified call reminder alert time profile, specifically the Time Interval Frequency Profile (TIFP). Furthermore, in addition to the Allowable Time of Day Profile (ATDP), the performing of the emitting the missed call reminder alert at block 330 may be subject to the Allowable Alert Time Profile (AATP) comprising the Allowable Time of Day Profile (ATDP) and an Allowable Days Of The Week Profile (ADOTW). In addition, the Allowable Time of Day Profile (ATDP) may also be dependent on a users availability stored in the calendar 122 in the static programmable memory 116 of the communications device 100. Thus, the user can (if desired) user the calendar 122 to override times stipulated in the Allowable Time of Day Profile (ATDP) as times when the missed call reminder alert can or cannot be emitted.

In summary, after the radio frequency communications unit 102 has received an unattended communications call, the processor 103 stores details of the unattended communications call in the static programmable memory 116 and thereafter the processor 103 performs comparing an identifier associated with a telephone number of an unattended received communications call with a database of alert profiles 200 stored the static programmable memory 116. The comparing identifies the call reminder alert time profile for the unattended received communications call. The processor 103 then further performs selecting an identified call reminder alert time profile for the unattended received communications call and controls the alert module 115 to emit the missed call reminder alert based on the identified call reminder alert time profile.

Take as an example an unattended received communications call is received from a telephone number 000110101, then at block 320 the telephone number 000110101 is compared with the database of alert profiles 200 and thus a call reminder alert time profile for the unattended received communications call is identified as belonging to the group "Family" since the telephone number 000110101 has a caller identifier of "Wife" which is from the group "Family" as listed in the group field 230. The method 300 then selects from the database of alert profiles 200, at block 325, an identified call reminder alert time profile for the unattended received communications call. This is associated with a group of telephone numbers for "Family" but it could simply be associated with just one telephone number. Then the emitting by the alert module 115, at block 330, of the missed call reminder alert is based on the identified call reminder alert time profile for the group "Family". Hence, by way of example, the Time Interval Frequency Profile (TIFP) for the group "family" is set be 10 minutes (IMPORTANT) and the Allowable Time of Day Profile (ATDP) for the group "Family" is set to ANYTIME that is preset to have the meaning 24 hours 7 days a week. Thus, the emitting by the alert module 115, at block 330, of the missed call reminder alert will be repeated every 10 minutes no matter what time of day the missed call was received until either the missed call is acknowledged or the predefined time duration (in this example one hour) has been exceeded as detected by test block 340. If the predefined time duration has been exceeded then the emitting by the alert module 115, at block 330, of the missed call reminder alert will be repeated at a time duration other than every 10 minutes.

As another example, if an unattended received communications call is received from a telephone number 099110101, then at block 320 the telephone number 099110101 is compared with the database of alert profiles 200 and thus a call reminder alert time profile for the unattended received communications call is identified as belonging to the group "Friend" since the telephone number 099110101 has a caller identifier of "Bill" which is from the group "Friend" as listed in the group field 230. The method 300 then selects from the database of alert profiles 200, at block 325, an identified call reminder alert time profile for the unattended received communications call. This is associated with a group of telephone numbers for "Friend" but it could simply be associated with just one telephone number. Then the emitting by the alert module 115, at block 330, of the missed call reminder alert is based on the identified call reminder alert time profile for the group "Friend". Hence, by way of example, the Time Interval Frequency Profile (TIFP) for the group "Friend" is set be 30 minutes (NOT URGENT) and the Allowable Time of Day Profile (ATDP) for the group "family" is set to AFTER WORK that is preset to have the meaning 7 pm to 10 pm weekdays. Thus, the emitting by the alert module 115, at block 330, of the missed call reminder alert will be repeated every 30 minutes the after from 7 pm to 10 pm until either the missed call is acknowledged or the predefined time duration (in this example one hour) has been exceeded as detected by test block 340. If the predefined time duration has been exceeded then the emitting by the alert module 115, at block 330, of the missed call reminder alert will be repeated at a time duration other than every 30 minutes.

As one further example, if an unattended received communications call is received from a telephone number 123456611, then at block 320 the telephone number 123456611 is compared with the database of alert profiles 200 and thus a call reminder alert time profile for the unattended received communications call is identified as belonging to the group "Avoid" since the telephone number 123456611 has a caller identifier of "Jim" which is from the group "Avoid" as listed in the group field 230. The method 300 then selects from the database of alert profiles 200, at block 325, an identified call reminder alert time profile for the unattended received communications call. This is associated with a group of telephone numbers for "Avoid" but it could simply be associated with just one telephone number. Then the emitting by the alert module 115, at block 330, of the missed call reminder alert is based on the identified call reminder alert time profile for the group "Avoid". Hence, by way of example, the Time Interval Frequency Profile (TIFP) for the group "Avoid" is set be V Low (1 hour) and the Allowable Time of Day Profile (ATDP) for the group "Avoid" is set to NEVER that is preset to have the meaning no time of day or the week is allocated for receiving reminder alerts for this group. Thus, the emitting by the alert module 115, at block 330, of the missed call reminder alert will be never be emitted as the user wished to avoid Jim.

Advantageously, the present invention alleviates the undesirable continuous repeating of missed call alerts at regular time intervals regardless of who was the caller. Further, if there are a plurality of unattended received communications calls with different alert time profiles, then the profile with the highest priority will be the profile that determines the emitting the missed call reminder alert times and/or frequency.

It will be appreciated that the embodiment of the present invention described herein may be comprised of one or more conventional processors and unique stored program instructions that control the one or more processors to implement, in conjunction with certain non-processor circuits, some, most, or all of the functions the device as described herein. The non-processor circuits may include, but are not limited to, a radio receiver, a radio transmitter, signal drivers, clock circuits, power source circuits, and user input devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

We claim:

1. A method for selecting a missed call alert, the method being performed by a communications device, the method comprising:

Comparing a telephone number, of a caller of an unattended received communications call received by the communication device, with a database of alert profiles stored in a memory of the communications device, the comparing identifying a call reminder alert time profile according to the telephone number of the caller for the unattended received communications call, the database storing user selectable alert profiles for a plurality of telephone numbers, and the call reminder alert time profiles having repeat profiles for at least two telephone numbers in the data base with different respective defined time interval frequencies;

Selecting, from the database of alert profiles, an identified call reminder alert time profile for the unattended received communications call according to the profile for the telephone number of the caller; and Emitting the missed call reminder alert based on the identified call reminder alert time profile for the telephone number, wherein emitting the missed call reminder alert is repeated at the time interval frequency determined by the call reminder alert time profile associated with the telephone number of the caller.

2. A method for selecting a missed call reminder alert as claimed in claim 1, wherein the identified call reminder alert time profile further comprises an allowable time of a day profile of when the emitting the missed call reminder alert is to be performed.

3. A method for selecting a missed call reminder alert as claimed in claim 2, wherein the time of day profile is dependent on a users availability stored in a calendar in the memory of the communications device.

4. A method for selecting a missed call reminder alert as claimed in claim 1, wherein the identified call reminder alert time profile further comprises an allowable days of the week profile of when the emitting the missed call reminder alert is to be performed.

5. A method for selecting a missed call reminder alert as claimed in claim 1, wherein telephone numbers are grouped in at least two groups, and each of the plurality of call reminder alerts is associated with a respective group, and the identified call reminder alert time profile associated with the telephone number is according to the profile associated with the group of telephone numbers that includes the telephone number of the caller.

6. A method for selecting a missed call reminder alert as claimed in claim 1, wherein emitting the missed call reminder alert is repeated at the time interval frequency determined by the call reminder alert time profile associated with the telephone number of the caller for a pre-defined number of repetitions and thereafter the time interval frequency is modified.

7. A method for selecting a missed call reminder alert as claimed in claim 6, wherein depending on the profile associated with the telephone number of the caller, the time interval frequency is selectively modified to be of a greater time duration between repeating the emitting the missed call reminder alert.

8. A method for selecting a missed call reminder alert as claimed in claim 6, wherein depending on the profile associated with the telephone number of the caller, the time interval frequency is selectively modified to be of a shorter time duration between repeating the emitting the missed call reminder alert.

9. A method for selecting a missed call reminder alert as claimed in claim 1, wherein the unattended received communications call is an unread received text message.

10. The method according to claim 1, wherein the telephone number of the unattended received communications call being the telephone number of a caller, caller ID, or the name in a text message.

11. A communications device comprising:

A processor;

A memory associated with the processor;

An alert module coupled to the processor; and

A communications unit coupled to the processor, wherein in operation after the communications unit has received an unattended communications call, the processor stores details of the unattended communications call in the memory and thereafter the processor performs comparing a telephone number of a caller of the unattended received communications call with a database of alert profiles stored a memory of the communications device, the comparing identifying call reminder alert time profile according to the telephone number of the caller for the unattended received communications call, the database storing user selectable alert profiles for a plurality of telephone numbers, and the call reminder alert time profiles having repeat profiles for at least two telephone numbers in the data base with different respective defined time interval frequencies, and wherein the processor further performs selecting an identified call reminder alert time profile for the unattended received communications call according to the profile for the telephone number of the caller and controlling the alert module to emit the missed call reminder alert based on the identified call reminder alert time profile for the telephone number, wherein emitting the missed call reminder alert is repeated at the time interval frequency determined by the call reminder alert time profile associated with the telephone number of the caller.

12. A communications device as claimed in claim 11, wherein the identified call reminder alert time profile further comprises an allowable time of a day profile of when the emitting the missed call reminder alert is to be performed.

13. A communications device as claimed in claim 12, wherein the time of day profile is dependent on a users availability stored in a calendar in the memory of the communications device.

14. A communications device as claimed in claim 11, wherein the identified call reminder alert time profile further comprises an allowable days of the week profile of when the emitting the missed call reminder alert is to be performed.

15. A communications device as claimed in claim 11, wherein telephone numbers are grouped in at least two groups, and the each of the plurality of call reminder alerts is associated with a respective group, and the identified call reminder alert time profile associated with the telephone number is according to with the profile associated with the group of telephone numbers that includes the telephone number of the caller.

16. A communications device as claimed in claim 11, wherein emitting the missed call reminder alert is repeated at the time interval frequency determined by the identified call reminder alert time profile associated with the telephone number of the caller for a pre-defined number of repetitions and thereafter the time interval frequency is modified.

17. A communications device as claimed in claim 16, wherein depending on the profile associated with the telephone number of the caller, the time interval frequency is modified to be of a greater time duration between repeating the emitting the missed call reminder alert.

18. A communications device as claimed in claim 16, wherein depending on the profile associated with the telephone number of the caller, the time interval frequency is modified to be of a shorter time duration between repeating the emitting the missed call reminder alert.

19. A communications device as claimed in claim 11, wherein the unattended received communications call is an unread received text message.

20. The communications device according to claim 11, wherein the telephone number of the unattended received communications call being the telephone number of a caller, caller ID, or the name in a text message.

* * * * *